(12) United States Patent
Childers et al.

(10) Patent No.: US 6,565,262 B2
(45) Date of Patent: May 20, 2003

(54) TRIGGER MECHANISM, OPTICAL CABLE CONNECTOR INCLUDING SAME, AND METHOD OF ASSEMBLING AN OPTICAL CABLE CONNECTOR

(75) Inventors: Darrell R. Childers, Hickory, NC (US); Thomas Theuerkorn, Hickory, NC (US); Joel C. Rosson, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 53 days.

(21) Appl. No.: 09/737,040

(22) Filed: Dec. 14, 2000

(65) Prior Publication Data

US 2002/0076164 A1 Jun. 20, 2002

(51) Int. Cl.⁷ ................................................. G02B 6/36
(52) U.S. Cl. ......................................... 385/76; 439/660
(58) Field of Search ............................ 385/76, 78, 136, 385/55, 56, 139, 59, 137; 439/660, 676

(56) References Cited

U.S. PATENT DOCUMENTS 5,638,474 A * 6/1997 Lampert et al. .............. 385/78
6,024,498 A * 2/2000 Cartisle ........................ 385/56
6,357,934 B1 * 3/2002 Driscoll et al. ............... 385/86

\* cited by examiner

*Primary Examiner*—Lynn D. Feild
*Assistant Examiner*—J. F. Duverne

(57) ABSTRACT

A snag-reducing member is disclosed for an optical fiber cable connector having a housing for insertion into a receptacle and a latch pivotably extending from the housing for securing the housing to the receptacle. The snag-reducing member includes a body configured to radially receive the optical fiber cable and to be axially slid along the optical fiber cable into engagement with the housing, and a trigger having a proximal end attached to the body and a distal end extending from the body. The distal end is movable toward and away from the body for engaging and pivoting the latch to selectably release the connector from the receptacle when the body is engaged with the housing. The distal end extends in a direction so as to reduce snagging of the latch when the optical fiber cable and connector are moved in a direction away from the receptacle. Duplex embodiments and related methods of assembling connectors are also disclosed.

31 Claims, 6 Drawing Sheets

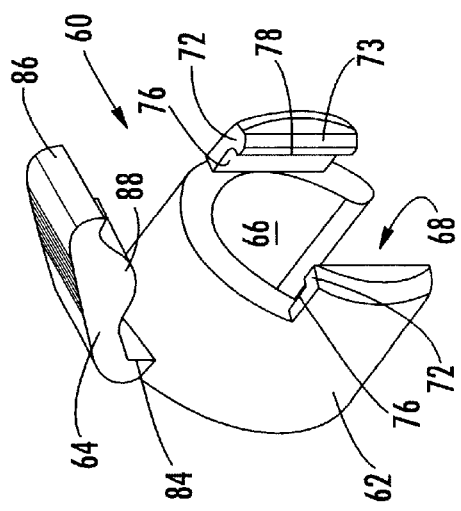
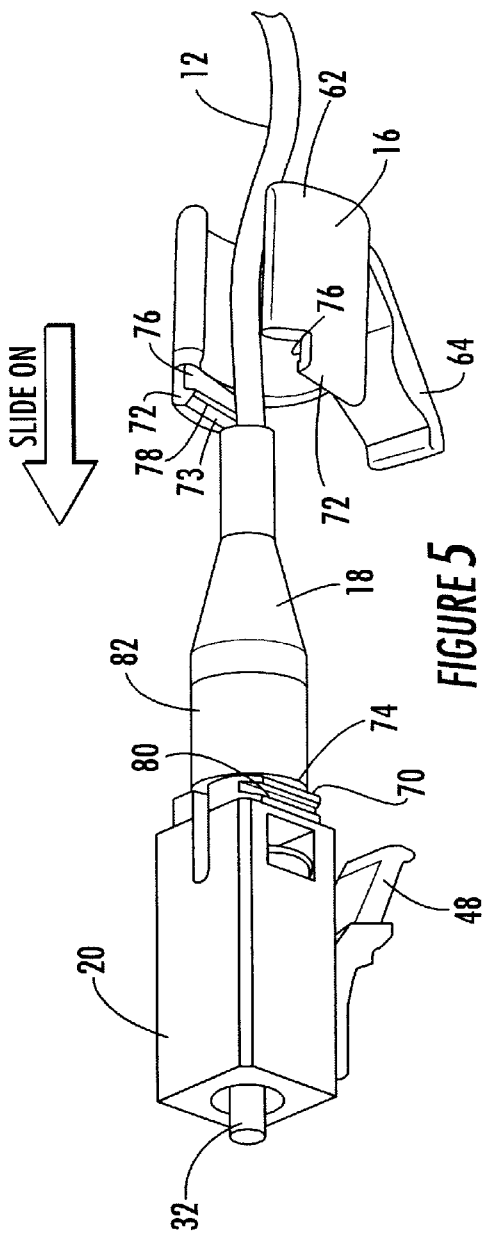

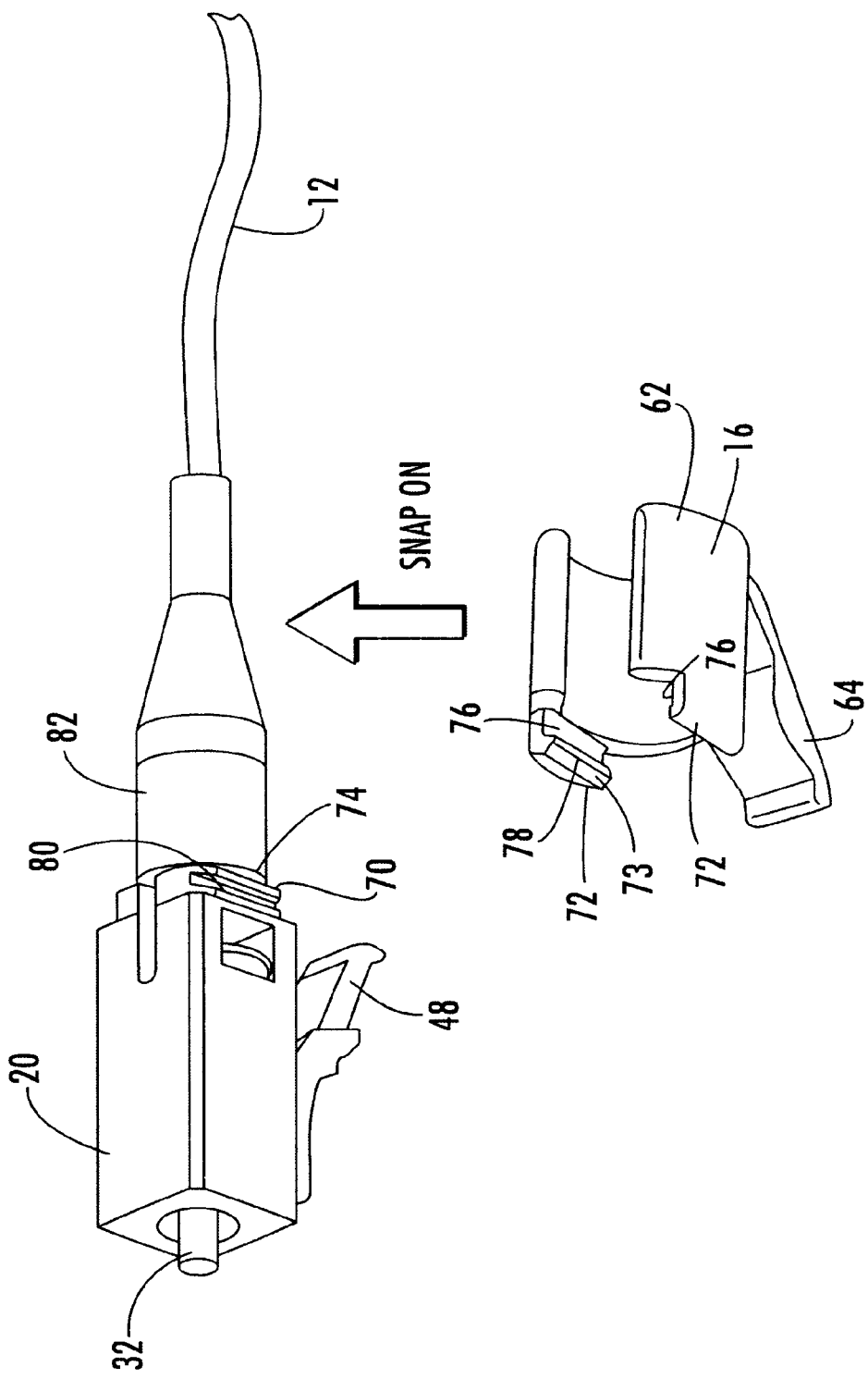

TRIGGER MECHANISM, OPTICAL CABLE CONNECTOR INCLUDING SAME, AND METHOD OF ASSEMBLING AN OPTICAL CABLE CONNECTOR

FIELD OF THE INVENTION

The invention relates generally to a trigger mechanism for optical cable connectors. More particularly, the invention relates a trigger mechanism that is removably attachable to the housing of a connector for engaging a latch on the connector housing and for preventing snagging of the latch.

BACKGROUND OF THE INVENTION

Various types of connectors have been developed for connecting optical cables to optical system components such as active or passive devices or to other optical cables. Numerous factors influence the design of such connectors, including the diameter and makeup of the optical fiber used in the cable, the environment into which the cable and connector are placed, the space available for connection and the number of connections required in a given location, to name but a few. Four of the optical cable connectors currently in common use have come to be known as SC-type, FC-type, ST-type, and RJ-type connectors.

RJ-type connectors include a cantilevered latch extending at an angle from an outer surface of the latch housing to engage the receptacle into which the connector is placed to secure the connector in place. The distal end of the latch extends generally backwardly (that is, away from the "front" end of the connector to be inserted into the receptacle and thus "back" in the direction of the cable). Well-known examples of RJ-type connectors include common telephone cord connectors and LC-type optical fiber connectors.

One drawback of RJ-type connectors is that if a cable on which the connector is mounted is pulled backwards after the connector is removed from the receptacle, the latch can get caught, thereby preventing further movement of the cable without potentially damaging or breaking the latch or the associated connector. This may occur, for example, if a cable technician tries to retrieve cables with RJ-type connectors extending through a duct or other remote space in which a large number of cables are present. In case of a snag that can not be reached or loosened by manipulating the cable or cables involved, the cable technician may have no alternative but to pull the snagged cable hard enough to damage or break the connector or other cables. Obviously, such potential situation undesirably puts precision equipment at risk of damage and, at the very least, wastes the time of the cable technician.

Various devices have been proposed to overcome such features of RJ-type connectors. For example, contoured sidewalls have been proposed at the end of the connector and on the latch itself to prevent or reduce snagging, as shown in U.S. Pat. Nos. 4,611,875 and 5,224,186. However, these devices are more difficult to plug in to and unplug from receptacles than are traditional RJ-type connectors due to the presence and locations of the sidewalls.

Also, a second cantilevered element similar to the latch, and often called a "trigger," has been included as part of RJ-type connector housings. The proximal end of the trigger is at the cable (back) end of the connector and the distal end extends forward to shield the latch in case the cable is pulled backwards. If the cable is pulled backwards, the outer surface of the trigger helps guide the connector in the desired direction while preventing the latch from snagging. When a cable technician squeezes the connector so that the trigger is pivoted down when the connector is in a receptacle, the trigger bottom surface contacts the top surface of the latch to also pivot the latch downward, thereby releasing the connector from the receptacle. One example of an LC connector having such a trigger is disclosed in U.S. Pat. No. 5,638,474.

While such trigger reliably prevents snags and is easy to plug and unplug, the presence of the trigger undesirably lengthens and enlarges the connector housing somewhat as compared to a comparable LC connector without a trigger. Also, the more complicated housing components including the trigger can be more difficult and expensive to mold. Further, to make connectors with triggers, various specific different parts must be manufactured and stocked, thereby incurring greater costs if options and alternatives in design are desired in a family of connectors, especially if some connectors have triggers and some do not. Moreover, both simplex and duplex connector devices may also be more difficult to manufacture and assemble in some cases when triggers are present on the individual connectors.

OBJECTIVES AND SUMMARY OF THE INVENTION

Accordingly, it is an objective of the present invention to provide a trigger mechanism, an optical cable connector including a trigger mechanism, and a method of assembling an optical cable connector including a trigger mechanism, wherein the component parts of the trigger mechanism and connector are simple, reliable, and economical to manufacture, assemble, and use. Other objectives and advantages of the invention will be apparent from the following description and the attached drawings, or can be learned through practice of the invention.

According to an aspect of the invention, a connector is disclosed for connecting an optical fiber cable to a receptacle, the connector includes a housing subassembly configured for receiving an end of the optical fiber cable and configured to be insertable into the receptacle. The housing subassembly includes a housing and a latch, the latch having a proximal end attached to an outer surface of the housing and a distal end extending from the outer surface. The latch distal end is movable toward and away from the outer surface and configured for engaging the receptacle for releasably securing the housing to the receptacle. A protective member includes a first element and a second element, the first element removably attachable to the housing, the second element having a proximal end attached to the first element and a distal end extending from the first element. The distal end is movable toward and away from the first element for engaging and moving the distal end of the latch to selectably release the housing subassembly from the receptacle. The protective member is configured so as to prevent snagging of the latch upon movement of the optical fiber cable and connector in a direction opposite the end of the optical fiber cable.

Preferably, the first element defines a longitudinally-extending opening configured for receiving the optical fiber cable and permitting the protective member to be longitudinally slid relative to the housing to thereby attach the protective member to the housing. The opening may be configured for permitting the protective member to be radially snapped onto the housing to thereby attach the member to the housing.

Mating attachment elements are preferably disposed on the housing and the first element for releasably attaching and axially securing the first element to the housing. The mating attachment elements may include snap members disposed on the first element and grooves disposed on the housing for receiving the snap members.

Mating alignment elements are preferably disposed on the housing and the first element for rotationally securing the first element relative to the housing. The mating alignment elements may include at least one noncircumferential surface disposed on the housing and at least one corresponding noncircumferential surface disposed on the first element. The noncircumferential surfaces are preferably planar surfaces.

A flexible boot may be disposed around the optical fiber cable and secured to the housing, the flexible boot having a portion disposed within the opening of the first element, the first element and flexible boot being secured together via a radial interference fit. The flexible boot may include an outer surface defining a channel for receiving the first element.

According to another aspect of the invention, a connector is disclosed for connecting an optical fiber cable to a receptacle, the connector including a housing subassembly configured for receiving an end of the optical fiber cable and configured to be insertable into the receptacle. The housing subassembly includes a housing and a latch, the latch having a proximal end attached to an outer surface of the housing and a distal end extending from the outer surface. The latch distal end is movable toward and away from the outer surface and configured for engaging the receptacle for releasably securing the housing to the receptacle. A protective member is attachable to the housing and includes a first element and second element. The second element has a proximal end attached to the first element and a distal end extending from the first element. The distal end is movable toward and away from the first element for engaging and moving the distal end of the latch to selectably release the subassembly from the receptacle. The first element defines a longitudinally-extending opening therethrough and a longitudinally-extending slot in communication with the opening. The slot is configured for permitting the optical fiber cable to be radially inserted into the opening via the slot, and the opening is configured for securing the member to the housing.

According to another aspect of the invention, a method is disclosed for assembling a connector including a housing subassembly having a latch, a protective member having a first element defining a longitudinal slot and an opening and having a second element extending from the first element, and a flexible boot, to an end of a optical fiber cable. The method includes the steps of inserting the end of the optical fiber cable through an opening in the flexible boot; inserting the end of the optical fiber cable through an opening in the housing subassembly; securing the optical fiber cable within the housing subassembly; attaching the flexible boot to the housing subassembly by sliding the flexible boot along the optical fiber cable relative to the housing subassembly; and attaching the protective member to the housing after attaching the flexible boot to thereby operatively align the latch and the second element.

The method may include the substeps of guiding the optical fiber cable through the slot into the opening and sliding the protective member along the optical fiber cable after the guiding substep. The method may alternately include the substep of radially sliding the protective member onto the housing. The method may also include the substeps of guiding attachment elements on the protective member into engagement with attachment elements on the housing subassembly, or of guiding alignment elements on the protective member into alignment with alignment elements on the housing subassembly.

According to another aspect of the invention, a multiplex connector assembly is disclosed for connecting at least two optical fiber cables to a receptacle, the multiplex connector assembly including at least two housing subassemblies, a respective one of the subassemblies being configured for receiving an end of the optical fiber cable and configured to be insertable into the receptacle, a respective one of the subassemblies including a housing and a latch. A respective one of the latches has a proximal end attached to an outer surface of the housing and a distal end extending from the outer surface, the latch distal end being movable toward and away from the outer surface and configured for engaging the receptacle for releasably securing the housing subassembly to the receptacle. A protective member is attachable to the housing and includes a first element and a second element. The second element has a proximal end attached to the first element and a distal end extending from the first element, the distal end being movable toward and away from the first element for engaging and moving the distal end of at least one of the latches to release at least one of the subassemblies from the receptacle. The first element defines at least two longitudinally-extending openings therethrough and at least two longitudinally-extending slots. Each slot is in communication with a respective one of the openings. Each slot is configured for permitting a respective one of the optical fiber cables to be radially inserted into the respective opening via the slot, and each opening is configured for attaching the protective member to a respective housing.

The second element may be configured to simultaneously release both of the latches, or may be configured to selectively release either of the latches. The second element may define at least two triggers disposed on opposite sides of the first element, the triggers being movable in substantially a single plane, the distal ends movable normal to each other.

According to another aspect of the invention, a snag-reducing member is disclosed for an optical fiber cable connector having a housing for insertion into a receptacle and a latch pivotably extending from the housing for securing the housing to the receptacle. The snag-reducing member includes a body configured to radially receive the optical fiber cable and to be axially slid along the optical fiber cable into engagement with the housing, and a trigger having a proximal end attached to the body and a distal end extending from the body. The distal end is movable toward and away from the body for engaging and pivoting the latch to selectably release the connector from the receptacle when the body is engaged with the housing. The distal end extends in a direction so as to reduce snagging of the latch when the optical fiber cable and connector are moved in a direction away from the receptacle.

The body preferably defines an opening therethough and a slot extending along the opening, the opening configured for radially receiving the optical fiber cable via the slot and sliding along the optical fiber cable. The snag-reducing member may be a duplex member for receiving two optical fiber cables each having a connector having a housing, and the body may be configured to radially receive the two optical fiber cables and to be axially slid along the optical fiber cables into engagement with the housings. If so, the body may define two openings therethough and two slots, each slot extending along a respective one of the openings, each opening configured for radially receiving a respective one of the optical fiber cables via the respective slot and sliding along the respective optical fiber cable.

BRIEF DESCRIPTION OF THE DRAWINGS

The above and other aspects, advantages, and objectives of the present invention are apparent from the detailed description below in combination with the drawings, in which:

FIG. 4 is a top perspective view of the trigger mechanism of FIG. 1;

FIG. 5 is a bottom perspective view of the optical cable connector of FIG. 1 showing a step in one method of assembling the connector;

FIG. 6 is a bottom perspective view of the optical cable connector of FIG. 1 showing a step in an alternate method of assembling the connector;

DETAILED DESCRIPTION OF THE INVENTION

Figure 1:
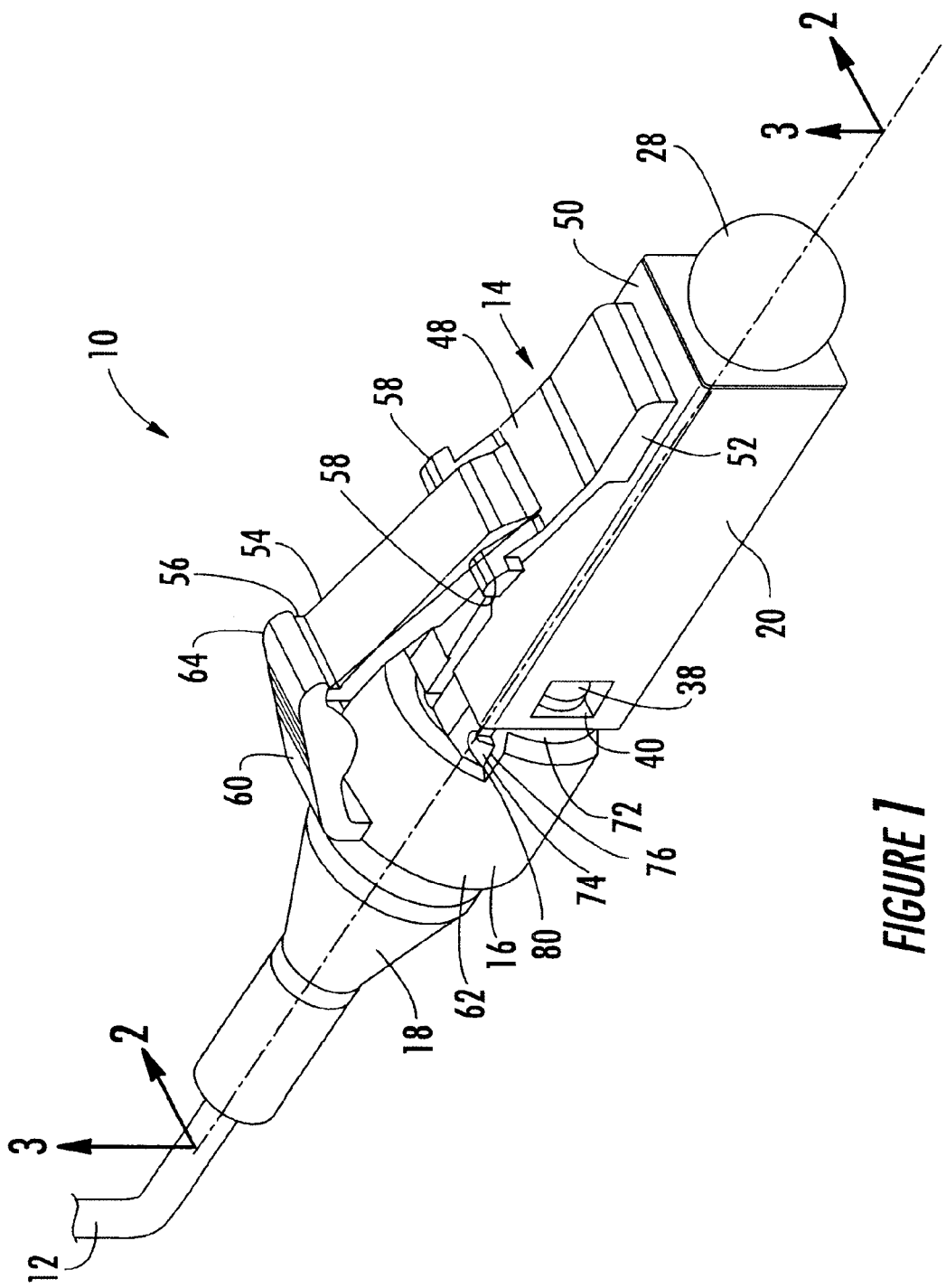
FIG. 1 is a perspective view of an exemplary embodiment of an optical cable connector including a trigger mechanism according to the present invention.

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and not meant as a limitation of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

Figure 2:
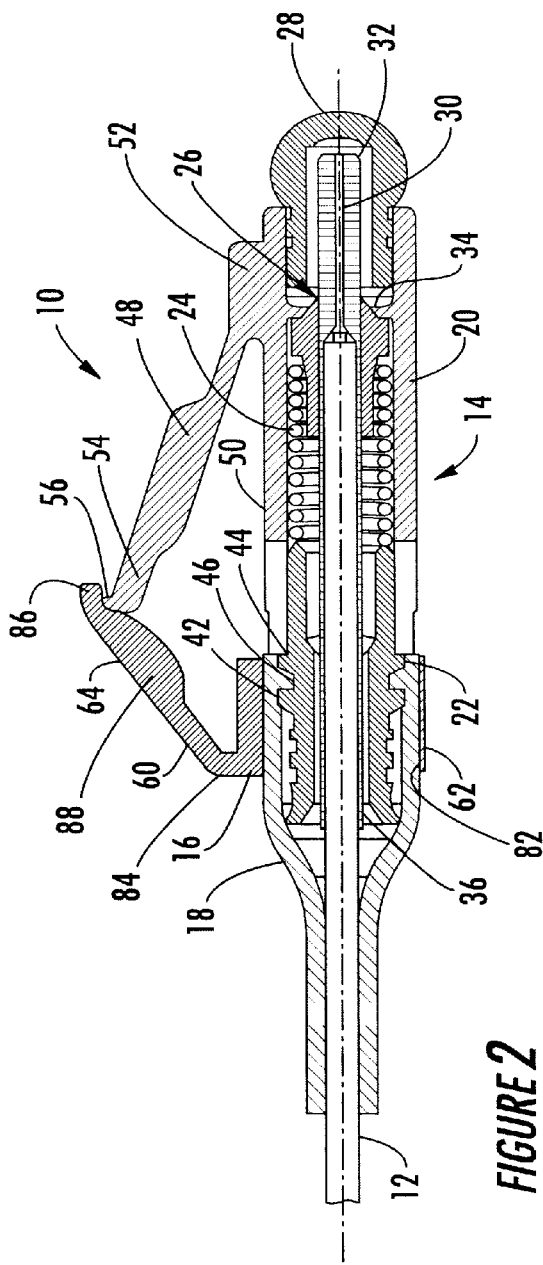
FIG. 2 is a sectional view of the optical cable connector of FIG. 1 taken along line II—II in FIG. 1.
Figure 3:
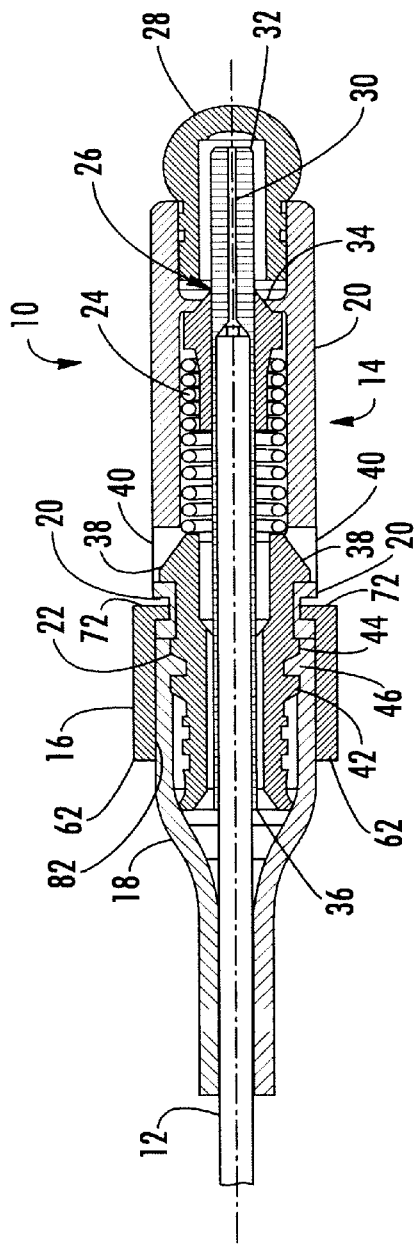
FIG. 3 is a sectional view of the optical cable connector of FIG. 1 taken along line III—III in FIG. 1.

As broadly embodied in FIGS. 1–3, a connector for connecting an optical fiber cable to a receptacle is provided. As shown in the Figures, connector 10 is a portion of a cable assembly with an LC connector attached at one end. While the Figures illustrate a portion of a preassembled cable assembly (a connector mounted on the end of an optical fiber), the protective member, discussed in greater detail below, can be used either with previously assembled cable assemblies or during the assembly of new cable assemblies. It should be understood that the following description of the disclosed embodiments is not intended to limit the present invention to use only on such preassembled connectors. Accordingly, the present invention is suitable for use with various types of connectors.

With more particular reference to the Figures, connector 10 is attached to an optical fiber cable 12. Connector 10 includes a housing subassembly 14, a trigger member 16, and a flexible boot 18. Housing subassembly 14 includes a housing 20, a crimp body 22, a spring 24 and a ferrule assembly 26. A dust cap 28, which is shown in U.S. Design patent application. Ser. No. 29/127, 591, incorporated by reference herein, is removably securable at one end of housing 14. An optical fiber 30 that extends out of cable 12 extends into a ferrule 32 of ferrule assembly 26. A ferrule holder 34 and a tube 36 also form part of ferrule assembly 26.

To assemble housing subassembly 14 to cable 12, boot 18 and crimp body 22 are slid over cable 12. Cable 12 is then attached to ferrule assembly 26 in a known manner, and the joined ferrule assembly and cable are secured within housing 20 by sliding crimp body 22 along the cable and into the housing until tabs 38 on the crimp body snap into openings 40 in the housing. Boot 18 is then slid onto crimp body 22 until interfering ridges 42, 44, and 46 matingly engage, thereby securing the boot to the crimp body and to the housing subassembly 14 in general. The above elements and assembly steps are known, and further detail need not be given to appreciate or practice the full range of the present invention.

According to one embodiment of the invention, a latch 48 extends from an outer surface 50 of housing 20. Latch 48 includes a proximal end 52 attached to the outer surface and a distal end 54 extending from the outer surface. A tip 56 of latch 48 may extend upwardly, as will be described below.

As in other RJ-type connectors, latch 48 is pivotable so that distal end 54 is movable toward and away from outer surface 50 of housing 20. Latch 48 includes two snap elements 58 configured for engaging a receptacle (not shown) to releasably secure housing 20 to the receptacle, as is commonly done with RJ-type connectors.

According to one embodiment of the invention, and as shown in FIGS. 1–4, trigger member 16 may have the form of a protective member 60 which is removably attached to housing subassembly 14. Protective member 60 includes a first element 62 and a second element 64. Protective member 60 is removably attached to housing 20 of housing subassembly 14 via first element 62. As broadly shown in FIG. 4, first element 62 preferably defines a longitudinally-extending opening 66 configured for receiving cable 12 and permitting protective member 60 to be longitudinally slid relative to housing 20 to thereby attach the protective member to the housing. More particularly, opening 66 is configured for permitting protective member 60 to be radially snapped onto housing 20. Accordingly, a slot 68 is provided in first element 62. Slot 68 should be wide enough to allow cable 12 or boot 18 to pass though the slot, as will be discussed below.

Mating attachment elements are provided respectively on housing 20 and first element 62 for releasably attaching and axially securing the first element to the housing. Preferably, the mating attachment elements comprise snap members 72 on protective member 60 and grooves 70 in housing 20. The locations of snap members 72 and grooves 70 could be switched. Snap members 72 may include chamfered edges 73 to allow protective member 60 to be more easily slid over boot 18. The mating attachment elements may alternately have other complimentary shapes, such as ridges, dimples, arcs, spherical sections, etc., within the scope of the invention.

Mating alignment elements are also provided for rotationally securing first element 62 relative to housing 20. The alignment elements may comprise any variety of noncircumferential surfaces that interferingly prevent substantial rotation of protective member 60 relative to housing assembly 14. The alignment elements may comprise for example, planar surfaces 74 and 76, as shown in FIGS. 4–6, that contact each other when protective member 60 is attached to housing 20. As shown, alignment elements 74 are on housing 20 and alignment elements 76 are on first element 62 of protective member 60. Alternately, the alignment elements may comprise planar surfaces 78 at the ends of snap members 72 and corresponding planar surfaces 80 at the bottom of grooves 70. Also, the alignment elements could have shapes other than planar, such as oblong, oval, irregular, etc., and be within the scope of the invention. When the alignment elements are aligned, second member 64 is also aligned with latch 48 (unless protective member 60 has been installed upside down). If desired, the attachment elements and alignment elements could be configured so that inadvertent misaligned attachment of protective member 60 to housing 20 is difficult or impossible, for example by making the attachment or alignment elements nonsymmetrical or irregular in some way.

Preferably, first element 62 of protective member 60 is secured to boot 18 via a radial interference fit. To better align protective member 60 and boot 18, a channel 82 may be provided to seat the protective member. First member 62 may thus be substantially C-shaped to snugly fit on boot 18. Although not illustrated, if boot 18 were a shape other than cylindrical (e.g., square, rectangular, etc., in cross-section), then protective member 60 would have a corresponding configuration.

Second element 64 of protective member 60 has a proximal end 84 attached to first element 62 and a distal end 86 extending from the first element. Second element 64 provides at least two functions. First, second element 64 is pivotable as is latch 48 and engages the latch to pivot the latch downward. The engagement moves distal end 54 of latch 48 downward to selectably release housing subassembly 14 from a receptacle. Second element 64 has a contoured surface 88 for contacting tip 56 of latch 48 and assisting in pivoting latch 48 downward when second element 64 is depressed. Second element 64 thus comprises a trigger element which releases latch 48 when the trigger element is depressed. The second function provided is that if cable 12 is pulled backwardly, second element 64 reduces the possibility of latch 48 snagging on other cables, corners, or other fixtures along the routing path, as the second element extends at an acute angle toward and beyond tip 56 of latch 48

FIGS. 5 and 6 illustrate methods of attachment of protective member 60 to housing subassembly 14. In FIG. 5, protective member 60 has been slid over cable 12 by passing cable 12 radially though slot 68 in first element 62. Protective member 60 is then slid as indicated in FIG. 5 until snap members 72 enter grooves 70, first element 62 enters channel 82, and pairs of surfaces 74–76 and 78–80 engage. Protective member 60 is thus axially and radially secured to housing subassembly 14. Sliding protective member 60 axially in the opposite direction will release the protective member from housing subassembly 14.

A manner less preferable but also potentially suitable in some circumstances of connecting protective member 60 with housing subassembly 14 is simply radially snapping the protective member on, as illustrated in FIG. 6. Such assembly puts more stresses on first element 62 and runs the risk of damage if protective member 60 is accidentally slid too far on to housing 14. However, in some configurations, such assembly would also work.

Use of a separate protective member 60 on which trigger element 64 is disposed provides numerous advantages over prior art devices. For example, triggering and anti-snag functions are still provided for latch 48, but manufacture of individual housing assembly parts is simpler since a complicated housing with a latch and trigger element need not be unitarily molded. Also, since protective member 60 can be secured over boot 18 rather than extending from a part of housing 20, the overall length of housing subassembly 14 to which the boot is attached can be shorter. Further, if no trigger element is desired, the housing subassembly can be used without one, thereby eliminating the number of parts that need to be manufactured to create a family of connectors.

Figure 7:
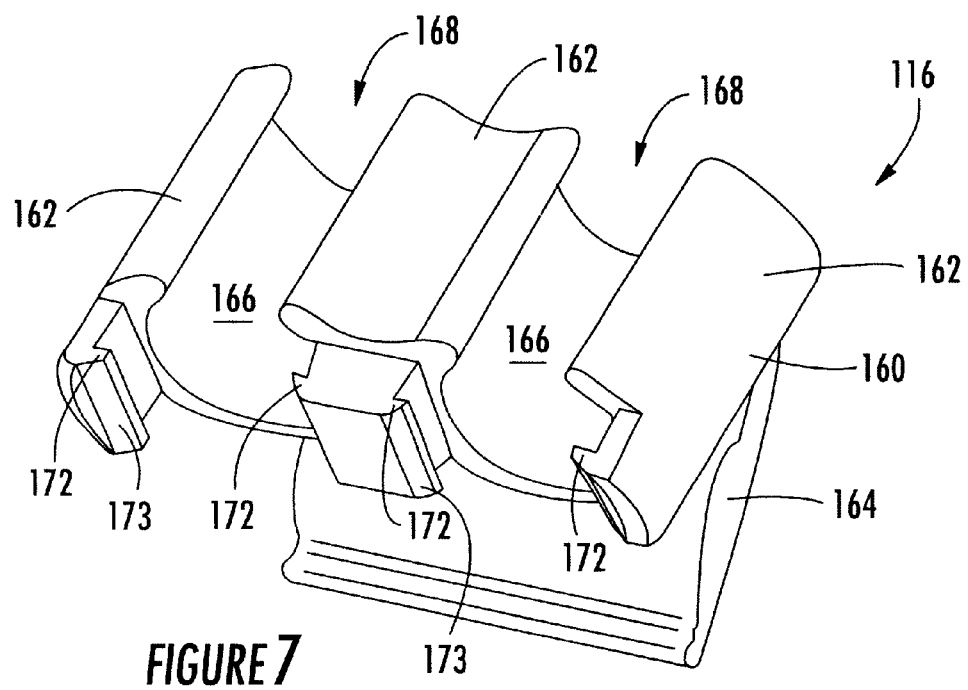
FIG. 7 is a bottom perspective view of an alternate trigger mechanism suitable for use in duplex connector applications.
Figure 8:
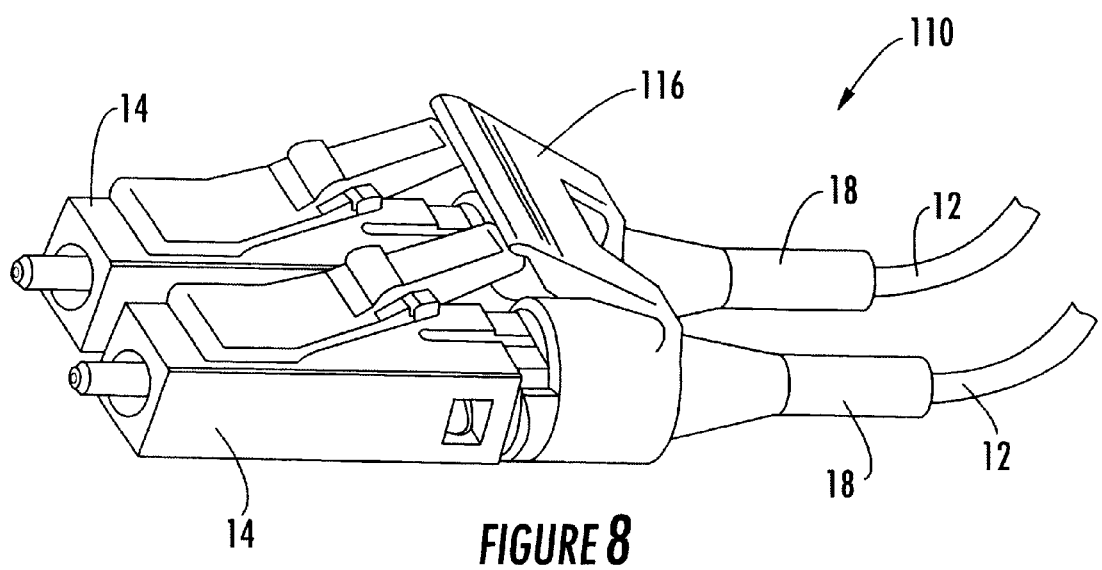
FIG. 8 is a perspective view of one duplex connector arrangement having latches disposed adjacent each other employing the trigger mechanism of FIG. 7.

FIG. 8 illustrates an embodiment of a duplex connector assembly 110. Assembly 110 includes two housing subassemblies 14, each connected to a respective cable 12 and boot 18. Trigger member 116 of FIGS. 7 and 8 is similar in construction to trigger member 16 of FIGS. 1–6, and includes a protective member 160 comprising a first element 162 and a second element 164. First element 162 defines two longitudinally extending openings 166, each for being slid along a respective cable 12 and boot 18. Slots 168 are in communication with openings 166 to allow the cables to be radially slid into the openings. Essentially, protective member 160 is formed of two of protective members 60 merged laterally. Connector assembly 110 of FIG. 8 is put together, taken apart, and used as described above regarding connector assembly 10. Pressing down on second element 164 releases both latches 48 simultaneously. Protective member 160 holds together the two joined housing subassemblies 14 and cables 12, into a single assembly for ease of manipulation and use where paired cables are desired. The anti-snag benefits of member 16 are also duplicated.

Duplex connector assembly 110 also provides the benefit of allowing the polarity of a paired set of cables to be reversed with very little effort and no need to detach and reconnectorize subassemblies 14 to do so. Thus, proper polarity may be readily selected in the field or may be reversed in the field simply by removing housing subassemblies 14 from protective member 160 and reinserting the housing subassemblies in opposite openings 166.

If desired, although not shown in the Figures, second element 164 could be readily formed to be divided into two separate elements, one for each latch 48. Thus, separate triggering of latches 48 would be possible. The triggering and anti-snag benefits described above would still be achieved by such structure.

Figure 9:
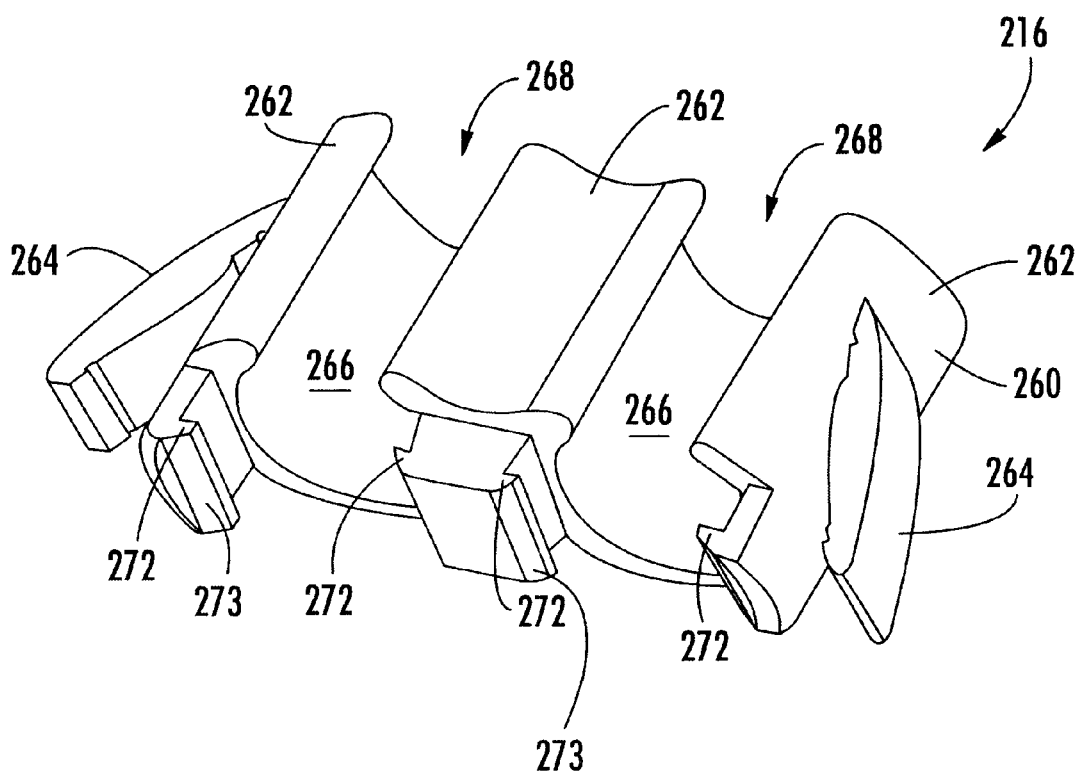
FIG. 9 is a bottom perspective view of another alternate trigger mechanism suitable for use in duplex connector applications.

FIG. 9 illustrates a second alternate embodiment of a trigger member 216 useful for duplex applications. Trigger member 216 is also defined by a protective member 260 having a first element 262 with two longitudinally extending openings 266 and slots 268 like protective member 160. However, protective member 260 includes two oppositely disposed second elements 264. Thus, two housing subassemblies (not shown in FIG. 9) would be inserted with their latches on opposite sides rather than adjacent each other as with trigger member 116. Trigger member 216 is useful in duplex applications when oppositely disposed latches are desired or required by the receptacle to be used. Each second element 264 would thus operate only a single latch, although the ability to select or switch polarity of paired cables is still provided. Anti-snag and triggering benefits are thus also provided by the dual second elements 264.

It will be apparent to those skilled in the art that various modifications and variations can be made in the present invention without departing from the scope and spirit of the invention. For example, specific shapes of various elements of the illustrated embodiments may be altered to suit particular connector or receptacle applications. It is intended that the present invention include such modifications and variations as come within the scope of the appended claims and their equivalents.

We claim:

1. A connector for connecting an optical fiber cable to a receptacle, the connector comprising:
   a housing subassembly configured for receiving an end of the optical fiber cable and configured to be insertable into the receptacle, the housing subassembly including a housing and a latch, the latch having a proximal end attached to an outer surface of the housing and a distal end extending from the outer surface, the latch distal end being movable toward and away from the outer surface and configured for engaging the receptacle for releasably securing the housing to the receptacle; and
   a protective member including a first element and a second element, the first element removably attachable to the housing, the second element having a proximal end attached to the first element and a distal end extending from the first element, the distal end being movable toward and away from the first element for engaging and moving the distal end of the latch to selectably release the housing subassembly from the receptacle, the protective member configured so as to prevent snagging of the latch upon movement of the optical fiber cable and connector in a direction opposite the end of the optical fiber cable.

2. The connector as recited in claim 1, wherein the first element defines a longitudinally-extending opening configured for receiving the optical fiber cable and permitting the protective member to be longitudinally slid relative to the housing to thereby attach the protective member to the housing.

3. The connector as recited in claim 2, wherein the opening is configured for permitting the protective member to be radially snapped onto the housing to thereby attach the member to the housing.

4. The connector as recited in claim 1, wherein mating attachment elements are disposed on the housing and the first element for releasably attaching and axially securing the first element to the housing.

5. The connector as recited in claim 4, wherein the mating attachment elements include snap members disposed on the first element and grooves disposed on the housing for receiving the snap members.

6. The connector as recited in claim 1, wherein mating alignment elements are disposed on the housing and the first element for rotationally securing the first element relative to the housing.

7. The connector as recited in claim 6, wherein the mating alignment elements include at least one noncircumferential surface disposed on the housing and at least one corresponding noncircumferential surface disposed on the first element.

8. The connector as recited in claim 7, wherein the noncircumferential surfaces are planar surfaces.

9. The connector as recited in claim 8, wherein the at least one noncircumferential surface includes two substantially parallel surfaces disposed on opposite sides of the housing.

10. The connector as recited in claim 1, further including a flexible boot disposed around the optical fiber cable and secured to the housing, the flexible boot having a portion disposed within the opening of the first element, the first element and flexible boot being secured together via a radial interference fit.

11. The connector as recited in claim 10, wherein the flexible boot includes an outer surface defining a channel for receiving the first element.

12. The connector as recited in claim 1, wherein the first element is substantially C-shaped.

13. The connector as recited in claim 1, wherein the second element includes a contoured camming surface for contacting the latch.

14. The connector as recited in claim 1, wherein the second element proximal end is spaced farther from the end of the optical fiber cable than is the second element distal end.

15. A connector for connecting an optical fiber cable to a receptacle, the connector comprising:
   a housing subassembly configured for receiving an end of the optical fiber cable and configured to be insertable into the receptacle, the housing subassembly including a housing and a latch, the latch having a proximal end attached to an outer surface of the housing and a distal end extending from the outer surface, the latch distal end being movable toward and away from the outer surface and configured for engaging the receptacle for releasably securing the housing to the receptacle; and
   a protective member attachable to the housing and including a first element and second element, the second element having a proximal end attached to the first element and a distal end extending from the first element, the distal end being movable toward and away from the first element for engaging and moving the distal end of the latch to selectably release the subassembly from the receptacle, the first element defining a longitudinally-extending opening therethrough and a longitudinally-extending slot in communication with the opening, the slot configured for permitting the optical fiber cable to be radially inserted into the opening via the slot, and the opening being configured for securing the member to the housing.

16. The connector as recited in claim 15, further comprising a flexible boot disposed around a first portion of an optical fiber cable adjacent an end of the cable, the opening being configured for securing the protective member to the flexible boot via a radial interference fit.

17. The connector as recited in claim 16, wherein the flexible boot includes an outer surface defining a channel for receiving the first element.

18. A method for assembling a connector including a housing subassembly having a latch, a protective member having a first element and a second element, the first element defining a longitudinal slot and an opening and the second element extending from the first element, and a flexible boot, the method comprising:
   a) inserting the end of the optical fiber cable through an opening in the flexible boot;
   b) inserting the end of the optical fiber cable through an opening in the housing subassembly;
   c) securing the optical fiber cable within the housing subassembly;
   d) attaching the flexible boot to the housing subassembly by sliding the flexible boot along the optical fiber cable relative to the housing subassembly; and
   e) attaching the protective member to the housing subassembly after step d) to thereby operatively align the latch and the second element.

19. The method of claim 18, wherein step e) includes the substeps of guiding the optical fiber cable through the slot into the opening and sliding the protective member along the optical fiber cable after the guiding substep.

20. The method of claim 18, wherein step e) includes the substep of radially sliding the protective member onto the housing.

21. The method of claim 18, wherein step e) further includes the substep of guiding attachment elements on the protective member into engagement with attachment elements on the housing subassembly.

22. The method of claim 18, wherein step e) further includes the substep of guiding alignment elements on the protective member into alignment with alignment elements on the housing subassembly.

23. A multiplex connector assembly for connecting at least two optical fiber cables to a receptacle, the multiplex connector assembly comprising:
at least two housing subassemblies, a respective one of the subassemblies being configured for receiving an end of the optical fiber cable and configured to be insertable into the receptacle, a respective one of the subassemblies including a housing and a latch, a respective one of the latches having a proximal end attached to an outer surface of the housing and a distal end extending from the outer surface, the latch distal end being movable toward and away from the outer surface and configured for engaging the receptacle for releasably securing the housing subassembly to the receptacle; and
a protective member attachable to the housing and including a first element and a second element, the second element having a proximal end attached to the first element and a distal end extending from the first element, the distal end being movable toward and away from the first element for engaging and moving the distal end of at least one of the latches to release at least one of the subassemblies from the receptacle, the first element defining at least two longitudinally-extending openings therethrough and at least two longitudinally-extending slots, each slot in communication with a respective one of the openings, each slot configured for permitting a respective one of the optical fiber cables to be radially inserted into the respective opening via the slot, and each opening being configured for attaching the protective member to a respective housing.

24. The multiplex connector assembly of claim 23, wherein the second element is configured to simultaneously release both of the latches.

25. The multiplex connector assembly of claim 23, wherein the second element is configured to selectively release either of the latches.

26. The multiplex connector assembly of claim 23, wherein the second element defines at least two triggers disposed on opposite sides of the first element, the triggers being movable in substantially a single plane, the distal ends movable normal to each other.

27. The multiplex connector assembly of claim 23, further including at least two flexible boots, each flexible boot being disposed around a respective optical fiber cable and secured to a respective housing, the flexible boot having a portion disposed within the opening of a respective one of the first elements, a respective one of the first elements and a respective one of the flexible boots being secured together via a radial interference fit.

28. A snag-reducing member for an optical fiber cable connector having a housing for insertion into a receptacle and a latch pivotably extending from the housing for securing the housing to the receptacle, the snag-reducing member comprising:
a body configured to radially receive the optical fiber cable and to be axially slid along the optical fiber cable into engagement with the housing; and
a trigger having a proximal end attached to the body and a distal end extending from the body, the distal end being movable toward and away from the body for engaging and pivoting the latch to selectably release the connector from the receptacle when the body is engaged with the housing, the distal end extending in a direction so as to reduce snagging of the latch when the optical fiber cable and connector are moved in a direction away from the receptacle.

29. A snag-reducing member as recited in claim 28, wherein the body defines an opening therethough and a slot extending along the opening, the opening configured for radially receiving the optical fiber cable via the slot and sliding along the optical fiber cable.

30. A snag-reducing member as recited in claim 28, wherein the snag-reducing member is a duplex member for receiving two optical fiber cables each having a connector having a housing, and wherein the body is configured to radially receive the two optical fiber cables and to be axially slid along the optical fiber cables into engagement with the housings.

31. A snag-reducing member as recited in claim 30, wherein the body defines two openings therethough and two slots, each slot extending along a respective one of the openings, each opening configured for radially receiving a respective one of the optical fiber cables via the respective slot and sliding along the respective optical fiber cable.

* * * * *